(12) United States Patent
Engel

(10) Patent No.: US 8,960,046 B2
(45) Date of Patent: Feb. 24, 2015

(54) LOCKING DEVICE FOR A VEHICLE STEERING SYSTEM

(75) Inventor: Rainer Engel, Krefeld (DE)

(73) Assignee: TRW Automotive GmbH, Alfdorf (DE)

( * ) Notice: Subject to any disclaimer, the term of this patent is extended or adjusted under 35 U.S.C. 154(b) by 295 days.

(21) Appl. No.: 13/701,175

(22) PCT Filed: May 5, 2011

(86) PCT No.: PCT/EP2011/002253
§ 371 (c)(1),
(2), (4) Date: Jan. 23, 2013

(87) PCT Pub. No.: WO2011/151003
PCT Pub. Date: Dec. 8, 2011

(65) Prior Publication Data
US 2013/0255431 A1    Oct. 3, 2013

(30) Foreign Application Priority Data

Jun. 2, 2010 (DE) .......................... 10 2010 022 513

(51) Int. Cl.
| | | |
|---|---|---|
| B62D 1/16 | (2006.01) | |
| B62D 1/184 | (2006.01) | |
| B60R 25/021 | (2013.01) | |
| B60R 25/0215 | (2013.01) | |
| B62D 5/04 | (2006.01) | |

(52) U.S. Cl.
CPC .......... B62D 1/184 (2013.01); B60R 25/02147 (2013.01); B60R 25/0215 (2013.01); B62D 5/04 (2013.01)

USPC .................... 74/495; 74/388; 74/496; 74/498

(58) Field of Classification Search
USPC ............ 74/388, 391, 492, 493, 495, 496, 498
See application file for complete search history.

(56) References Cited

U.S. PATENT DOCUMENTS

| | | | |
|---|---|---|---|
| 4,552,000 A | | 11/1985 | Lipschutz |
| 5,427,555 A | * | 6/1995 | Merten ........................ 440/61 B |
| 6,763,907 B2 | * | 7/2004 | Ueno et al. .................... 180/444 |

(Continued)

FOREIGN PATENT DOCUMENTS

| | | |
|---|---|---|
| DE | 102006045382 A1 | 4/2008 |
| DE | 102008040877 A1 | 2/2010 |

(Continued)

OTHER PUBLICATIONS

International Search Report from PCT/EP2011/002253 dated Jun. 30, 2011.

(Continued)

*Primary Examiner* — Toan To
(74) *Attorney, Agent, or Firm* — MacMillan, Sobanski & Todd, LLC

(57) ABSTRACT

A locking device for a vehicle steering system, having a steering gear, a servomotor which is adapted to provide a steering assist force, a blocking ring which is assigned to a motor shaft of the servomotor, and a locking member which is adapted to engage in the blocking ring to block rotation of the motor shaft of the servomotor and thereby to lock the steering gear, further provision being made for an actuating member having the locking member adjustably mounted thereon, and the actuating member being adjustable by a drive motor between a blocking position and a release position.

16 Claims, 9 Drawing Sheets

(56) References Cited

U.S. PATENT DOCUMENTS

| | | | |
|---|---|---|---|
| 7,477,036 B2* | 1/2009 | Koike et al. | 318/489 |
| 8,019,508 B2* | 9/2011 | Takeuchi et al. | 701/42 |
| 8,336,412 B1* | 12/2012 | Ishii et al. | 74/388 PS |
| 2003/0136211 A1* | 7/2003 | Ishii et al. | 74/388 PS |
| 2006/0219470 A1* | 10/2006 | Imagawa et al. | 180/446 |
| 2006/0220607 A1* | 10/2006 | Imagawa et al. | 318/638 |
| 2007/0144823 A1* | 6/2007 | Senda et al. | 180/444 |
| 2008/0073144 A1* | 3/2008 | Takeuchi et al. | 180/446 |
| 2008/0217098 A1* | 9/2008 | Takeuchi et al. | 180/446 |
| 2011/0152027 A1* | 6/2011 | Ohno et al. | 475/150 |
| 2012/0303218 A1* | 11/2012 | Tamura et al. | 701/41 |

FOREIGN PATENT DOCUMENTS

| | | |
|---|---|---|
| EP | 1308356 A1 | 5/2003 |
| EP | 1380480 A1 | 1/2004 |
| EP | 2033859 A2 | 3/2009 |
| FR | 2793749 A1 | 11/2000 |
| WO | 2004007252 A2 | 1/2004 |

OTHER PUBLICATIONS

German Search Report from TRW Automotive GmbH 10 2010 022 513.4 dated Nov. 22, 2011.

* cited by examiner

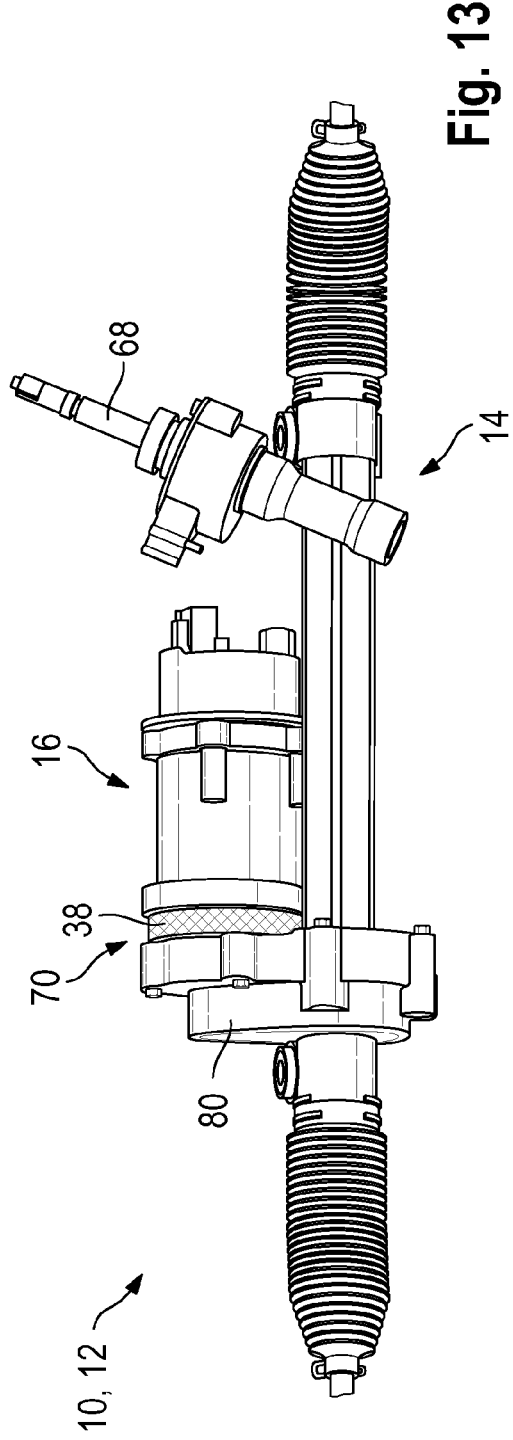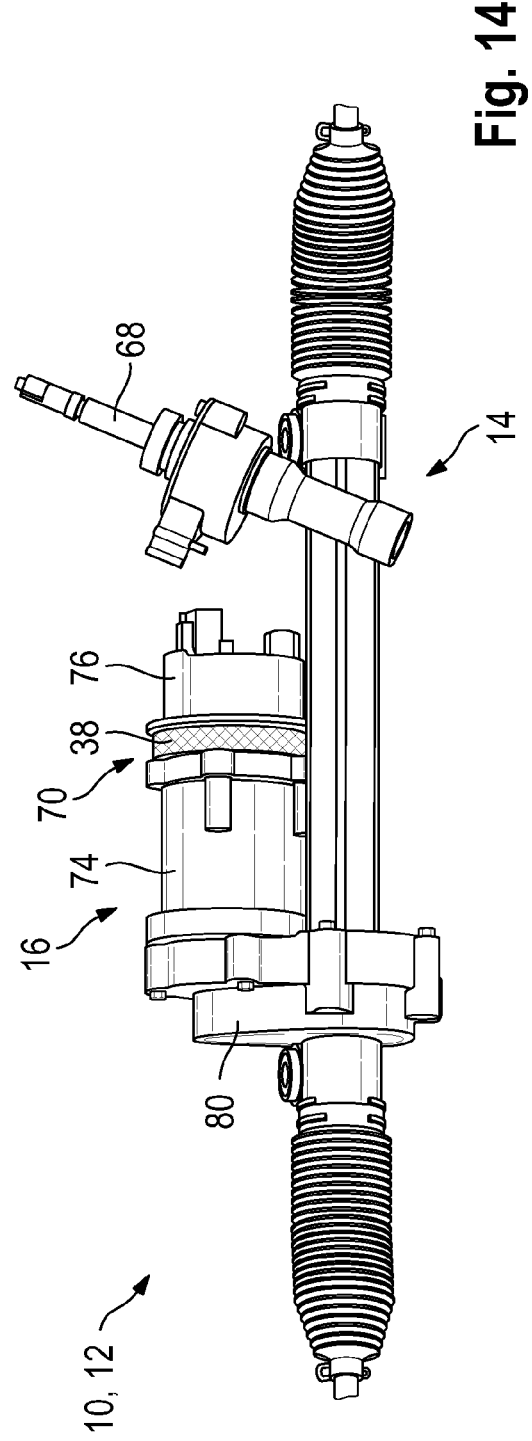

LOCKING DEVICE FOR A VEHICLE STEERING SYSTEM

CROSS-REFERENCE TO RELATED APPLICATIONS

This application is a national stage of International Application No. PCT/EP2011/002253 filed May 5, 2011, the disclosures of which are incorporated herein by reference in entirety, and which claimed priority to German Patent Application No. DE 10 2010 022 513.4 filed Jun. 2, 2010, the disclosures of which are incorporated herein by reference in entirety.

BACKGROUND OF THE INVENTION

The invention relates to a locking device for a vehicle steering system, including a steering gear, a servomotor which is adapted to provide a steering assist force, a blocking ring which is assigned to a motor shaft of the servomotor, and a locking member which is adapted to engage in the blocking ring to block rotation of the motor shaft of the servomotor and thereby to lock the steering gear.

Locking devices of this type, also referred to as steering wheel locks, are generally known from the prior art and assume the function of an anti-theft device in a vehicle. A generic locking device for motor vehicles is described, for example, in EP 1 308 356 A1.

BRIEF SUMMARY OF THE INVENTION

A feature of the invention to provide a locking device for a vehicle steering system which, for one thing, acting as an anti-theft device if necessary, ensures a reliable and robust locking of the steering gear and, for another thing, is constructed to be simple and compact.

According to the invention, this feature is achieved by a locking device of the type initially mentioned, which additionally includes an actuating member having the locking member adjustably mounted thereon, the actuating member being adjustable by a drive motor between a blocking position and a release position. The use of two separate members that are adjustable relative to each other both allows an undesirable locking of the steering gear during driving operation to be largely ruled out and also a reliable and robust locking of the steering gear after parking the vehicle to be ensured. In comparison with variant embodiments having merely one single, combined actuating and locking member, these two basic functions of the locking device are considerably better to realize.

In one embodiment of the locking device, the actuating member is an actuating lever which is swivel-mounted in a housing. Furthermore, the locking member preferably is a locking lever which is swivel-mounted to the actuating member. This construction with two swiveling levers is compact, which turns out to be extremely advantageous in view of the limited installation space available in the region of the vehicle steering system.

More particularly, a swivel axis of the actuating member and a swivel axis of the locking member may be identical and may preferably extend parallel to the axis of the motor shaft. This results in a particularly compact locking device requiring a minimum amount of installation space.

In a further embodiment of the locking device for a vehicle steering system, the blocking ring is connected to the motor shaft via a slip clutch. This slip clutch constitutes an overload protection for the vehicle steering system by allowing the steering wheel and the steerable wheels to be shifted as of a predefined torque load, in order to prevent damage to the vehicle steering system. Since the slip clutch is arranged on the motor shaft of the servomotor and a transmission is typically provided in the vehicle steering system, this slip clutch needs to be designed merely for fractions of the torque applied to the steering wheel when the servomotor is suitably positioned. As a result of this relatively low "slipping torque", the clutch may likewise be of a very compact design, which in turn contributes to a small installation space requirement of the entire locking device.

Preferably, a spring, in particular a C-spring, is provided in the locking device, the spring urging the actuating member to the release position. In this way, this spring reliably prevents an undesirable locking of the steering gear during driving operation.

The actuating member may be provided with a toothed segment which is engaged by a gearwheel coupled to the drive motor.

Preferably, the gearwheel is a worm and the toothed segment is a worm segment here. The adjustment of the actuating lever is thus effected by means of a worm gear, which distinguishes itself by a high degree of self-locking in the event of a standstill or failure of the drive motor. Accordingly, any additional means for fixing the actuating lever in a desired position may be dispensed with.

In a further embodiment of the locking device, provision is made for a spring which urges the locking member against the blocking ring, that is, towards an engagement into the blocking ring. When the actuating member is suitably positioned, this spring ensures in a simple manner that a locking of the steering gear is effected within a predefined angle of rotation.

The locking device furthermore preferably includes a sensor for detecting the position of the actuating member. A small Hall sensor is made use of here, for example, which allows a permanent function check of the locking device while requiring little installation space and involving little effort.

Expedient configurations of the invention and its advantages will be apparent from the dependent claims.

Other advantages of this invention will become apparent to those skilled in the art from the following detailed description of the preferred embodiments, when read in light of the accompanying drawings.

BRIEF DESCRIPTION OF THE DRAWINGS

FIG. 13 shows a perspective view of a further vehicle steering system with a locking device according to the invention;

FIG. 14 shows a perspective view of a further vehicle steering system with a locking device according to the invention;

DETAILED DESCRIPTION OF THE INVENTION

Figure 1:
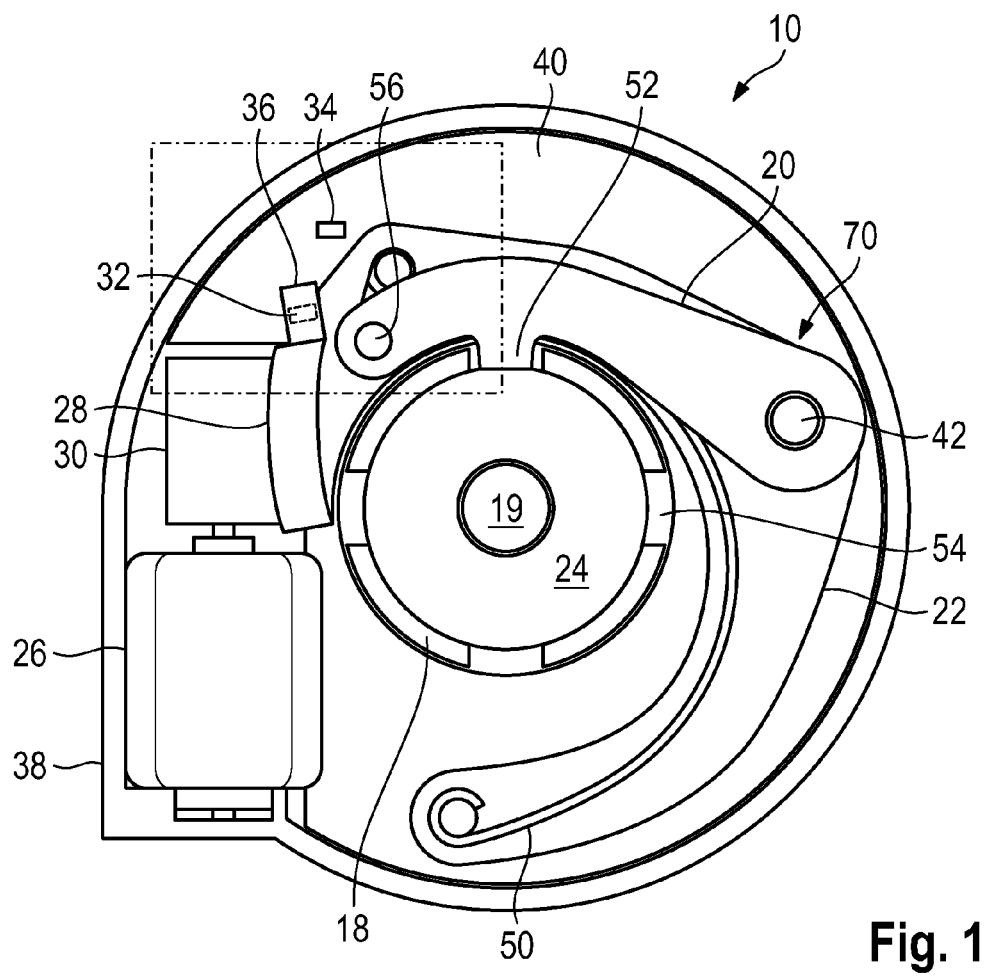
FIG. 1 shows a top view of a locking device according to the invention.

FIG. 1 shows a locking device 10 for a vehicle steering system 12. FIGS. 9 to 12 illustrate vehicle steering systems 12 by way of example, which include a locking device 10 having a steering gear 14 and a servomotor 16 for providing a steering assist force.

Apart from the steering gear 14 and the servomotor 16, the locking device 10 according to FIG. 1 comprises a blocking ring 18 that is associated with a motor shaft 19 of the servomotor 16, a locking member 20 which is adapted to engage in the blocking ring 18 to block rotation of the motor shaft 19 of the servomotor 16 and thereby to lock the steering gear 14, and an actuating member 22 having the locking member 20 adjustably mounted thereon.

Here, the blocking ring 18 is connected to the motor shaft 19 of the servomotor 16 via a slip clutch in a known manner. In the present exemplary embodiment, a friction attachment 24 is provided for this purpose, which is connected to the motor shaft 19 for joint rotation therewith and is in frictional contact with the blocking ring 18 to form the slip clutch. This clutch provides for a friction fit connection between the blocking ring 18 and the friction attachment 24 up to a predefined, preferably adjustable limit torque, and thus for a substantially rotationally fixed coupling between the blocking ring 18 and the motor shaft 19.

The slip clutch therefore constitutes an overload protection for the vehicle steering system 12; this means that in the case of very high, manually applied torques, it prevents damage to individual system components in that it permits the steering wheel and the steerable wheels to be shifted involving a frictional resistance in the case of torques that are above the limit torque.

Because of the transmission usually provided in the vehicle steering system 12, with the servomotor 16 suitably arranged, a torque applied to the steering wheel must possibly be many times higher than the limit torque set at the slip clutch in order to reach a shifting of the steering wheel and of the steerable wheels when the steering gear 14 is locked. In this case, a particularly advantageous, compact configuration of the slip clutch is therefore possible.

As an example, the limit torque of the slip clutch may be on the order of 5 Nm. However, a torque on the order of 100 Nm needs to be applied to the steering wheel in order that a slipping of the clutch and, hence, a shifting of the steering wheel and the steerable wheels is reached when the steering gear 14 is locked.

The locking device 10 further comprises a drive motor 26 for adjusting the actuating member 22. To this end, the actuating member 22 is provided with a toothed segment 28 which is engaged by a gearwheel 30 coupled to the drive motor 26.

According to FIG. 1, the gearwheel 30 driven by the drive motor 26 is a worm and the toothed segment 28 of the actuating member 22 is a worm segment. This drive of the actuating member 22 by means of such a worm gear is particularly advantageous since this type of gear distinguishes itself by a high degree of self-locking. This means that the actuating member 22 will remain in its position even in the event of a standstill or failure of the drive motor 26, so that any additional means for fixing the actuating member 22 in position may be dispensed with.

Figure 2:
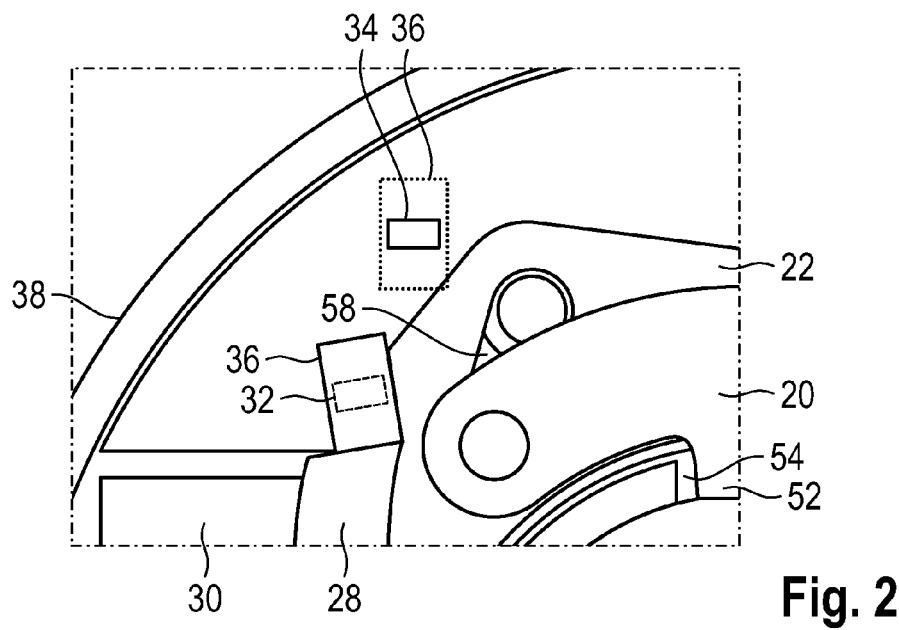
FIG. 2 shows a detail of the top view according to FIG. 1.

In order that a function check of the locking device 10 can be carried out, according to FIG. 1 provision is made for two sensors 32, 34 for detecting the position of the actuating member 22, with FIG. 2 showing a detail of FIG. 1 in the region of these sensors 32, 34.

Preferably, small Hall sensors are made use of for the sensors 32, 34, which are available at low cost and allow a position sensing of the actuating member 22 with little effort. To this end, it is merely required to provide a sensor magnet 36 on the actuating member 22, the sensor magnet 36 being operatively connected to one sensor 32 in a blocking position of the actuating member 22 according to FIGS. 1 and 2. When the actuating member 22 is in a release position as in FIG. 4, the sensor magnet 36 assumes a position as indicated with a dotted line in FIG. 2, in which it is operatively connected to the other sensor 34.

As a result, the set position of the actuating member 22 can be determined by means of the sensors 32, 34 at any time, and thus a function check of the locking device 10 can be performed. The various set positions of the actuating member 22 will still be discussed in greater detail below with reference to FIGS. 4 to 6.

Figure 3:
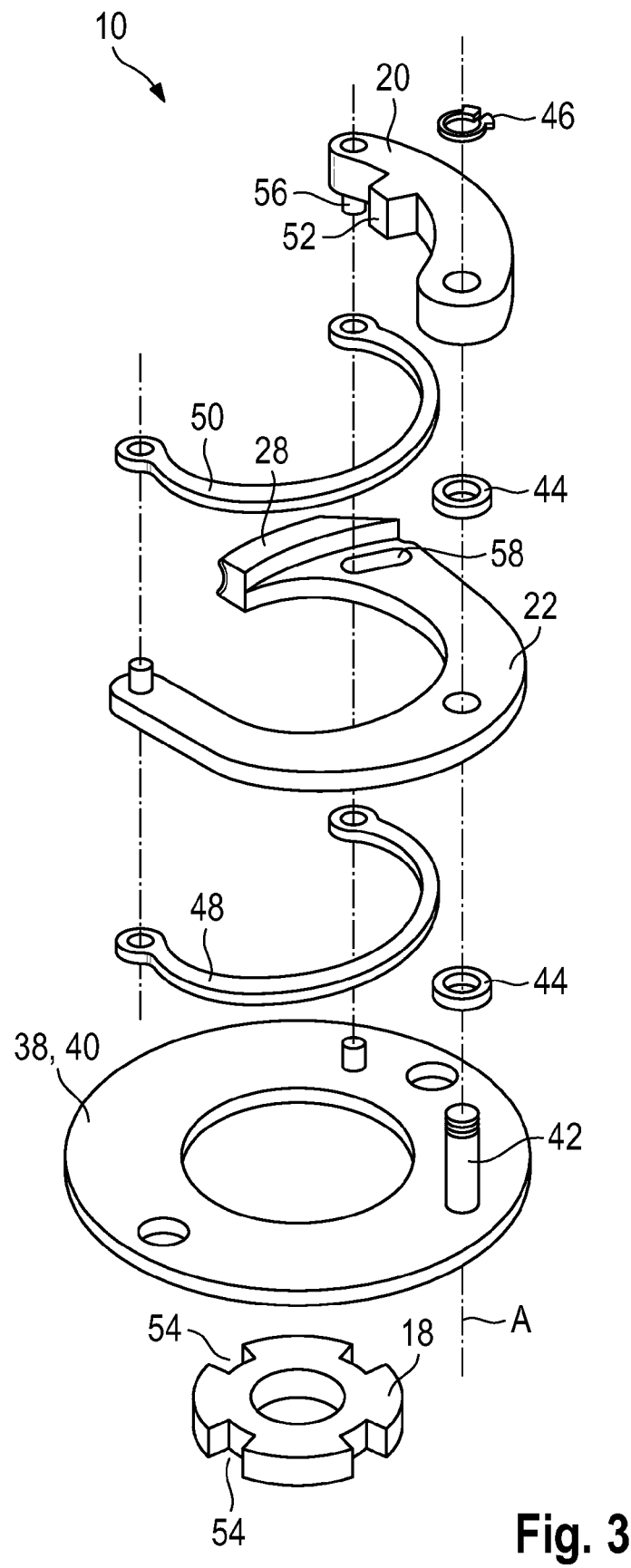
FIG. 3 shows a perspective exploded view of the locking device according to the invention.

FIG. 3 shows a perspective exploded view of several parts of the locking device 10 of the vehicle steering system 12.

First of all, it is noticeable that in the extremely compact construction of the locking device 10 according to FIG. 3, the actuating member 22 is a swiveling actuating lever and the locking member 20 is a swiveling locking lever. The actuating lever is swivel-mounted in a housing 38 here, of which merely a base plate 40 is illustrated in FIG. 3. The locking lever, for its part, is swivel-mounted at the actuating member 22, with a swivel axis A of the actuating member 22 and a swivel axis A of the locking member 20 being identical. The swivel axis A is defined here by an axially oriented pin 42 that is fastened onto the base plate 40; the actuating member 22 and the locking member 20 are placed on the pin 42 in a manner spaced apart by washers 44 and fixed in place by a clamping ring 46.

According to FIG. 3, provision is made for a spring 48 for acting on the actuating member 22 relative to the base plate 40, this spring 48 being in the form of a C-shaped spring. In addition, the locking device 10 comprises a further spring 50 for acting on the locking member 20 relative to the actuating member 22, this spring 50 also being a C-shaped spring, one end of which is fitted to the actuating member 22 and the other, opposite end of which is fitted to the locking member 20.

Provided at the ends of the respectively C-shaped springs 48, 50 are openings which can be used for placing the springs 48, 50 on respective axial extensions of the base plate 40, the actuating member 22 or the locking member 20, to fasten the springs 48, 50 to the respective component for swiveling motion.

The locking member 20 which is designed as a locking lever curved in an arc shape is provided with a locking nose 52 adapted to cooperate with the blocking ring 18 by means of an engagement in one of the recesses 54 of the blocking ring 18.

In the present case, four recesses 54 are arranged uniformly distributed over the circumference of the blocking ring 18, so that when the actuating member 22 is in the blocking position, only a rotation of the motor shaft 19 of less than 90 degrees is possible before the locking nose 52 engages in one of the recesses 54.

The C-spring 50 engages a guide pin 56 of the locking member 20, the guide pin 56 extending through a recess 58 in the actuating member 22 in the assembled condition of the locking device 10. The recess 58 is configured as an elongated hole here and, together with the engaging guide pin 56, it forms a slotted guide by means of which the locking member 20 can be swiveled to a limited extent relative to the actuating member 22.

FIG. 3 furthermore shows that the actuating member 22 is formed as an actuating lever curved in an arc shape and surrounds the blocking ring 18 by more than 180 degrees. This has an especially advantageous effect on a compact construction while desirable leverages are provided at the same time.

Figure 4:
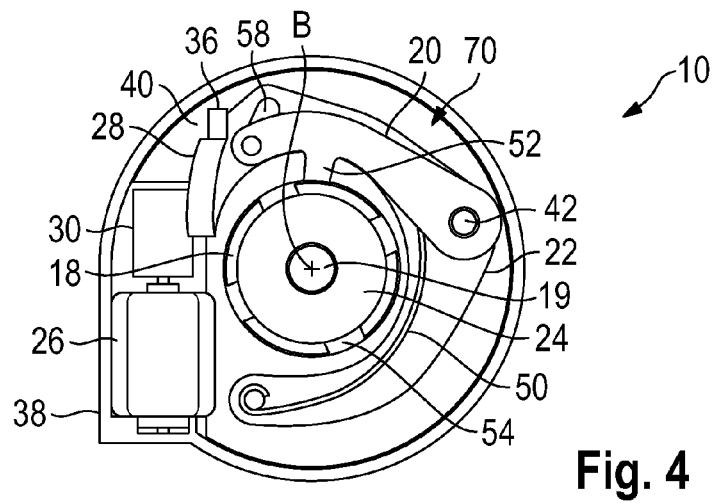
FIG. 4 shows a top view of the locking device according to the invention in a release position.
Figure 5:
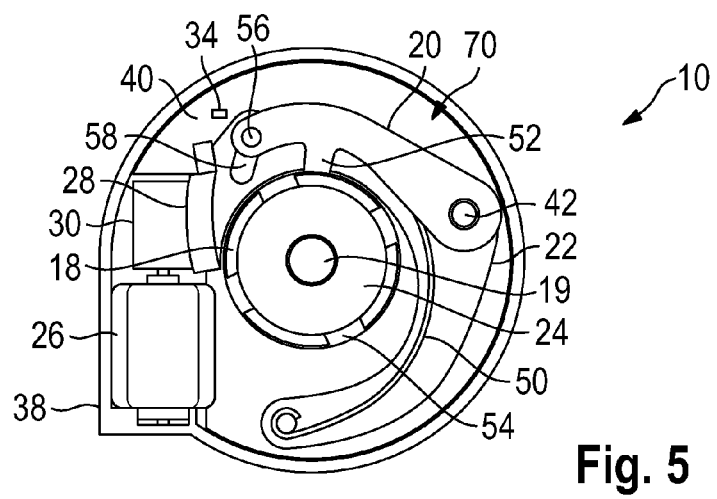
FIG. 5 shows a top view of the locking device according to the invention in a blocking position, with the locking member not being locked.
Figure 6:
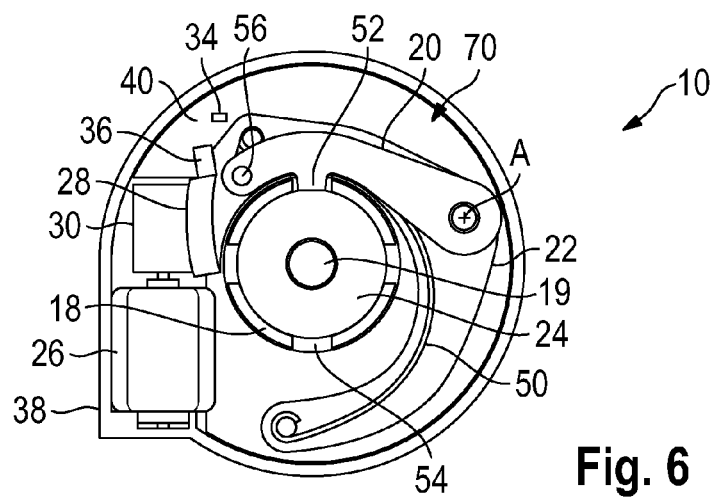
FIG. 6 shows a top view of the locking device according to the n in a blocking position, with the locking member locked.

FIGS. 4 to 6 show the locking device 10 of a vehicle steering system 12 in different set positions.

According to FIG. 4, the actuating member 22 is in a release position (swiveled upward in FIG. 4). In this release position, locking of the steering gear 14 is not possible since the slotted guide prevents the locking member 20 from being swiveled toward an engagement in the blocking ring 18. This release position is assumed by the actuating member 22 during driving operation, for example, so that any undesirable locking of the steering gear 14 during driving operation is largely ruled out. To ensure the release position of the actuating member 22 even in the event that the worm gear is damaged, for example, the actuating member 22 is additionally urged to this release position by the spring 48.

According to FIG. 5, the actuating member 22 is in a blocking position (swiveled downward in FIG. 5), in which it allows the locking member 20 to block the motor shaft 19 and thus to lock the steering gear 14. Starting from the release position according to FIG. 4, the actuating member 22 that is adjustable between the release position and the blocking position has been moved to its blocking position according to FIG. 5 by the drive motor 26. As compared to FIG. 4, the locking member 20 practically remains in its position and, according to FIG. 5, rests against the blocking ring 18 between two recesses 54. In doing so, the locking member 20 is urged against the blocking ring 18, that is, towards an engagement into the blocking ring 18, by the spring 50. Therefore, a swiveling of the actuating member 22 is only possible due to the slotted guide between the actuating member 22 and the locking member 20.

FIG. 6 shows the locking device 10 with the steering gear 14 locked. Just like in FIG. 5, the actuating member 22 is in its blocking position. Caused by a rotation of the blocking ring 18, for example by a manual rotation of the steering wheel, one of the recesses 54 has reached a swiveling area of the locking nose 52. As a result of its being acted upon by the spring 50, the locking nose 52 snaps into the recess 54 of the blocking ring 18 and in this way prevents a further rotation of the blocking ring 18 and of the motor shaft 19, so that the steering gear 14 is locked in this engagement position of the locking member 20.

In order to cancel this locking of the steering gear 14, the drive motor 26 has to shift the actuating member 22 back to its release position according to FIG. 4 by means of the worm gear. Owing to the slotted guide between the actuating member 22 and the locking member 20, the locking member 20 is thereby also swiveled to the position according to FIG. 4 and thus the blocking ring 18 is released.

Figure 7:
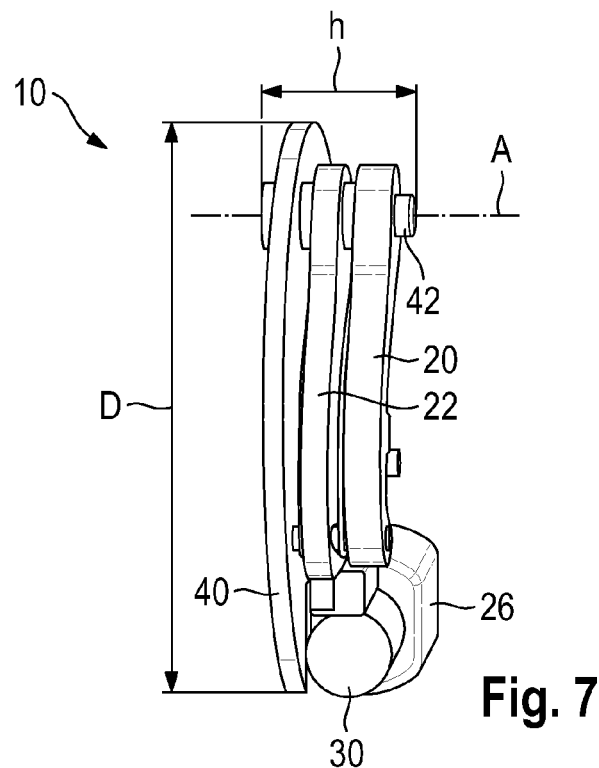
FIG. 7 shows a side view of the locking device according to the invention.

FIG. 7 shows a side view of a subassembly of the locking device 10. This view illustrates the compact construction of the locking device 10 especially clearly. Preferred dimensions h, D of the subassembly shown, viewed in the direction of the swivel axis A, are preferably on the order of h≈2 cm in terms of height and, viewed perpendicularly to the swivel axis A, on the order of D≈8 cm in diameter.

Figure 8:
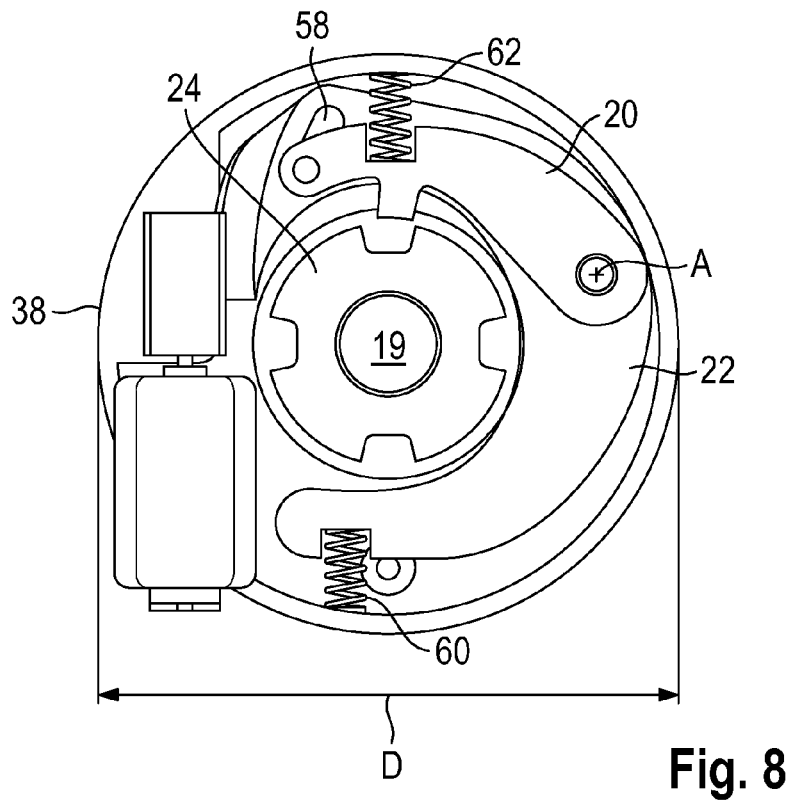
FIG. 8 shows a top view of the locking device according to an alternative variant embodiment of the invention.

FIG. 8 shows a slightly modified variant embodiment of the locking device 10. Here, the C-shaped springs 48, 50 (cf. FIG. 3, for example) have merely been replaced with pressure springs 60, 62.

The pressure spring 60, on the one hand, bears on the housing 38 of the locking device 10 and, on the other hand, on the actuating member 22. It urges the actuating member 22 to its release position and, therefore, functionally corresponds to the C-shaped spring 48 in FIG. 3.

The pressure spring 62, on the one hand, bears on the housing 38 of the locking device 10 and, on the other hand, on the locking member 20. It urges the locking member 20 against the blocking ring 18 and, therefore, functionally corresponds to the C-shaped spring 50 in FIG. 3.

Figure 9:
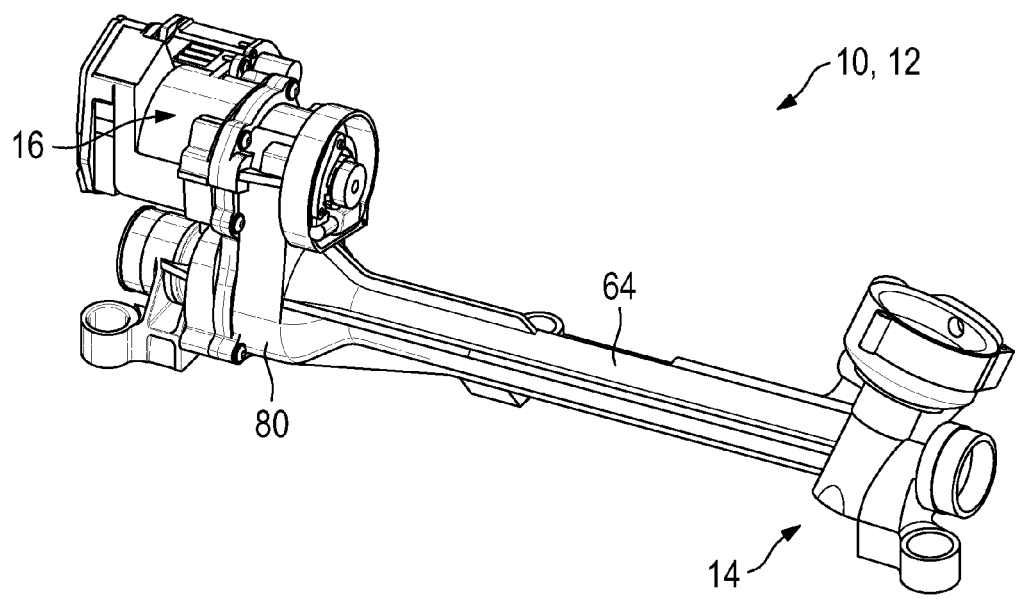
FIG. 9 shows a perspective view of a vehicle steering system with a locking device according to the invention.

FIG. 9 shows the vehicle steering system 12 according to a first embodiment, the vehicle steering system 12 including the locking device 10 described above. The servomotor 16 here is arranged on the edge of a steering rack housing 64 of the steering gear 14 and introduces its steering assist force directly into a steering rack (not shown) of the steering gear 14. Owing to the transmission usually provided in the vehicle steering system 12, the limit torque of the slip clutch can be reduced without reducing the steering resistance in this embodiment of the locking device 10, so that the slip clutch can be given an extremely compact design.

Figure 10:
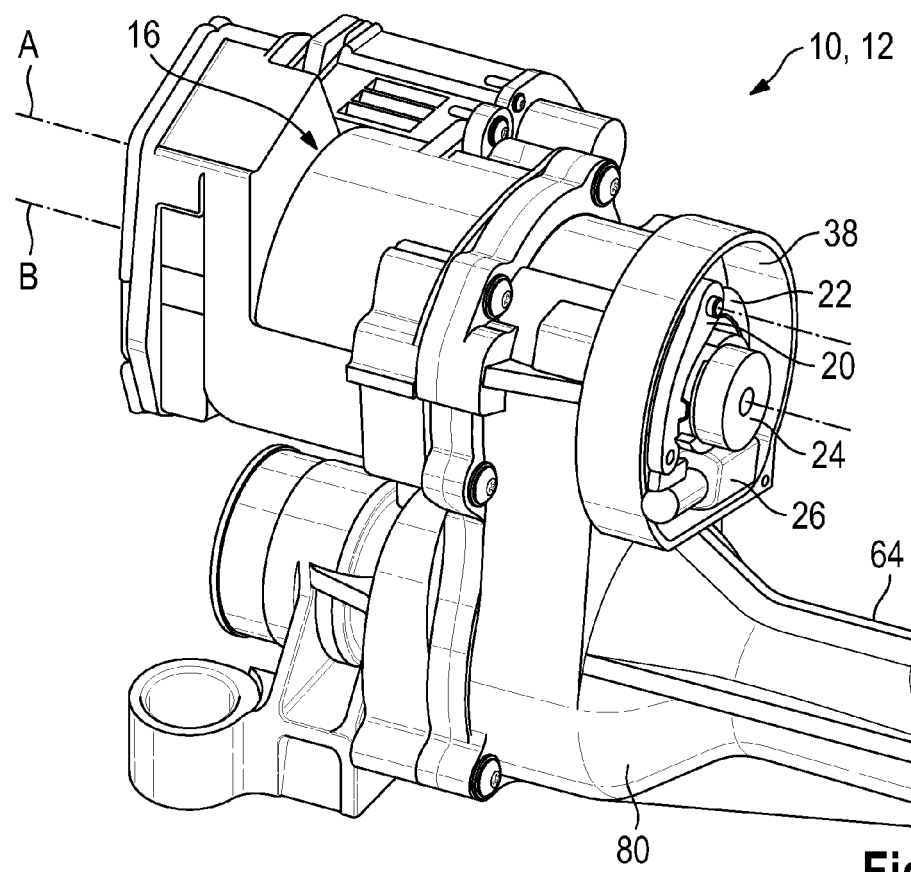
FIG. 10 shows a detail of the perspective view according to FIG. 9 in the region of the locking device according to the invention.

FIG. 10 shows a detail of the vehicle steering system 12 according to FIG. 9 in the region of the servomotor 16. The arrangement of the actuating member 22, the locking member 20, and the drive motor 26 can be seen in this detail. The swivel axis A of the actuating member 22 and of the locking member 20 here extends parallel to the axis B of the motor shaft 19.

Figure 17:
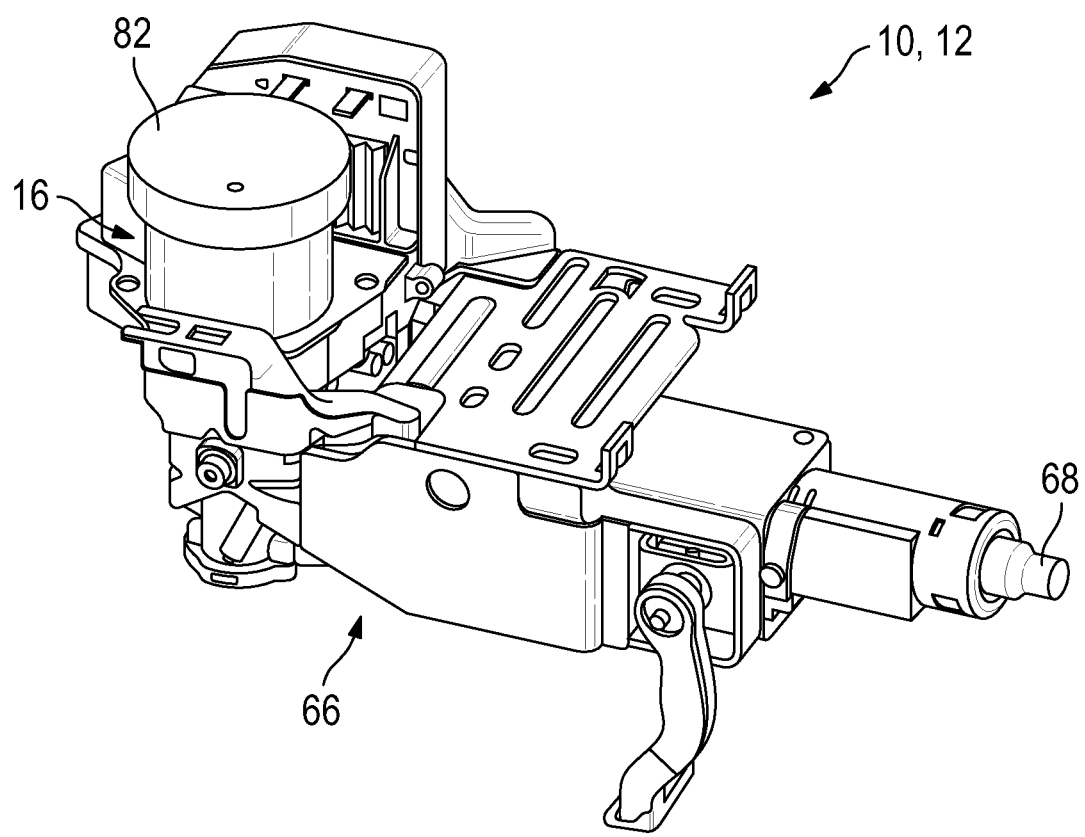
FIG. 17 shows a further perspective view of the vehicle steering system according to FIG. 15.

To protect the locking device 10, specifically its locking mechanism 70 comprising the blocking ring 18, the locking member 20, the actuating member 22, and also the springs 48, 50 and the drive motor 26, from external influences, provision is preferably made for a cover that closes the housing 38 on the side facing away from the servomotor 16 (cf. FIG. 17, item 82). Such a cover is not shown in FIGS. 9 and 10 for a better illustration of the locking device 10.

Figure 11:
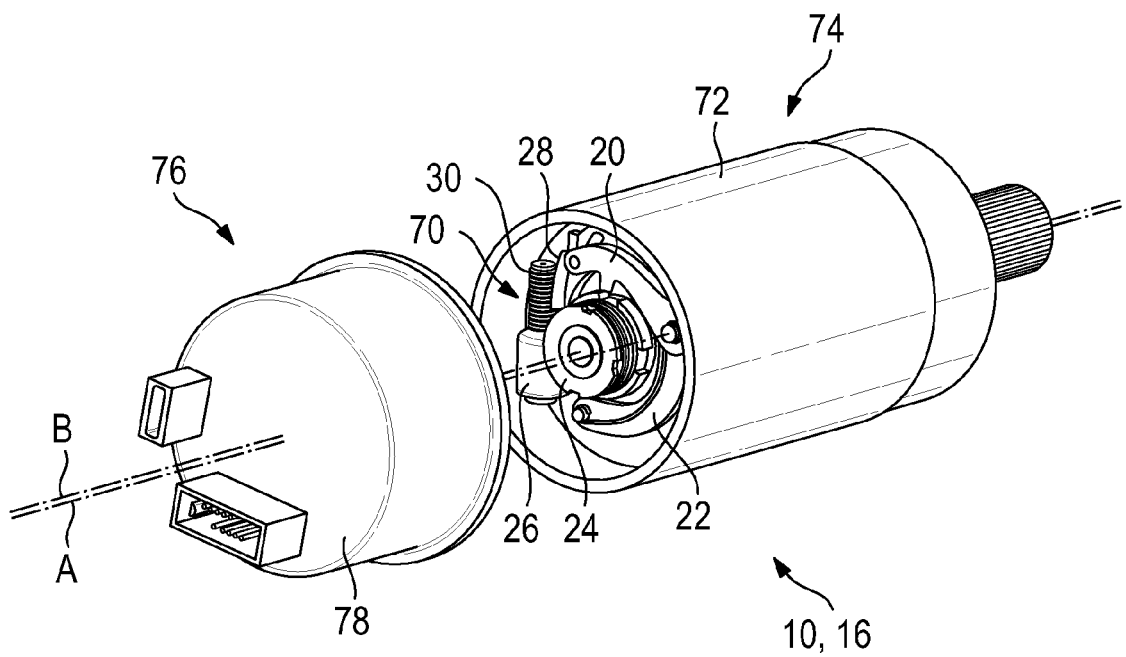
FIG. 11 shows a perspective view of the locking device according to the invention, with the control unit of the servomotor removed.
Figure 12:
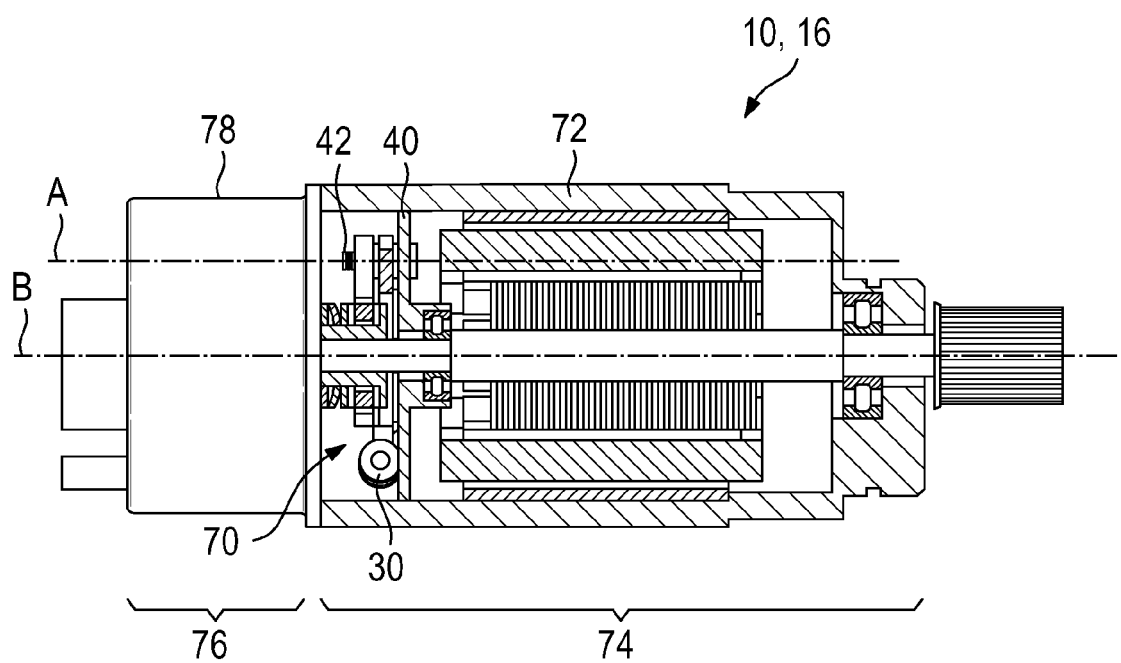
FIG. 12 shows a longitudinal section taken through the assembled locking device according to FIG. 11.

FIGS. 11 and 12 show an embodiment of the locking device 10 in which the locking mechanism 70 is accommodated in a motor housing 72 of the servomotor 16. In the axial direction, the locking mechanism 70 is arranged here between a drive unit 74 and an electronic control unit 76 of the servomotor 16. The control unit 76 is received within a motor cover 78 which closes the motor housing 72. The locking mechanism 70 is thus disposed so as to be protected within the closed motor housing 72, but is also readily accessible by a simple removal of the motor cover 78.

FIGS. 13 and 14 show two further variant embodiments of the vehicle steering system 12 with a locking device 10. In this case, the locking mechanism 70 is not received within the motor housing 72, but is configured as an independent, separate module which may be mounted at different positions of the vehicle steering system 12. In FIG. 13, for instance, the module is arranged between the servomotor 16 and a steering gear housing 80, whereas in FIG. 14, the module is installed between the drive unit 74 and the electronic control unit 76 of the servomotor 16.

Figure 15:
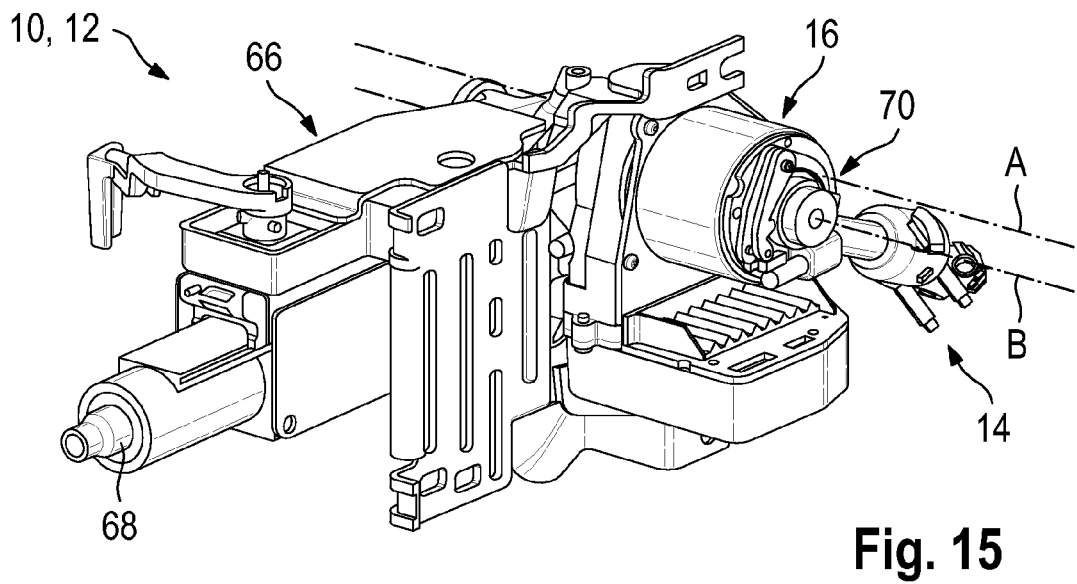
FIG. 15 shows a perspective view of a further vehicle steering system with a locking device according to the invention.

FIG. 15 shows the vehicle steering system 12 according to a further embodiment, the vehicle steering system 12 including the locking device 10 described above. Unlike in the preceding embodiments, the servomotor 16 in this case is mounted to the housing 66 of a steering shaft 68 of the vehicle steering system 12 and introduces its steering assist force into the steering shaft 68.

Figure 16:
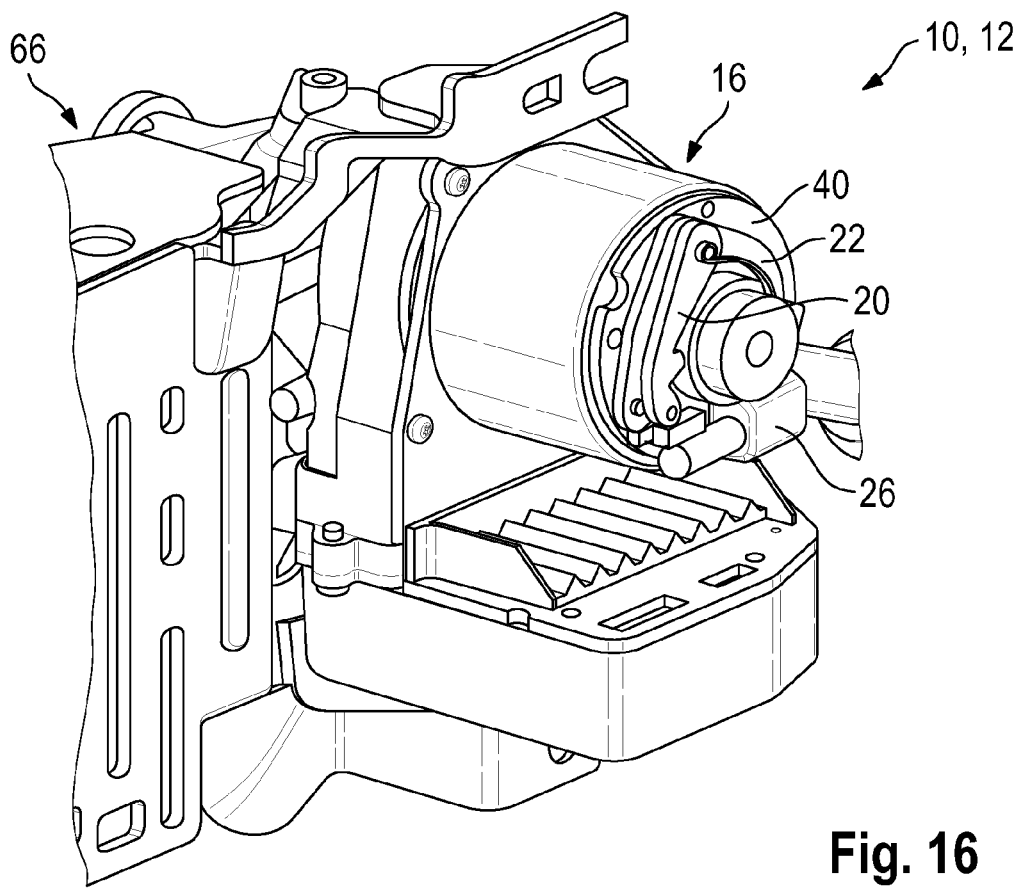
FIG. 16 shows a detail of the perspective view according to FIG. 15 in the region of the locking device according to the invention.

For an increased clarity of the individual parts of the locking device 10, FIG. 16 shows a detail of the vehicle steering system 12 according to FIG. 15 in the region of the servomotor 16.

Finally, FIG. 17 shows the vehicle steering system 12 according to FIG. 15 in a perspective view, with a cover 82 being provided on the servomotor 16 or on the base plate 40, the cover 82 covering the locking mechanism 70 and in this way protecting it against external influences.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A locking device for a vehicle steering system, comprising:
   a steering gear,
   a servomotor which is adapted to provide a steering assist force,
   a blocking ring which is assigned to a motor shaft of the servomotor, and
   a locking member which is adapted to engage in the blocking ring to block rotation of the motor shaft of the servomotor and thereby to lock the steering gear,
   wherein an actuating member is provided which has the locking member adjustably mounted thereon,
   the actuating member being adjustable by a drive motor between a blocking position and a release position.

2. The locking device according to claim 1, wherein the actuating member is an actuating lever which is swivel-mounted in a housing.

3. The locking device according to claim 1, wherein the locking member is a locking lever which is swivel-mounted to the actuating member.

4. The locking device according to claim 1, wherein a swivel axis of the actuating member and a swivel axis of the locking member are identical.

5. The locking device according to claim 1, wherein a swivel axis of the actuating member and a swivel axis of the locking member extend parallel to an axis of the motor shaft.

6. The locking device according to claim 1, wherein the blocking ring is connected to the motor shaft via a slip clutch.

7. The locking device according to claim 1, wherein a spring is provided which urges the actuating member to the release position.

8. The locking device according to claim 1, wherein the actuating member is provided with a toothed segment which is engaged by a gearwheel coupled to the drive motor.

9. The locking device according to claim 8, wherein the gearwheel is a worm and the toothed segment is a worm segment.

10. The locking device according to claim 1, wherein the locking member is provided with a locking nose adapted to cooperate with the blocking ring.

11. The locking device according to claim 1, wherein a spring is provided which urges the locking member against the blocking ring.

12. The locking device according to claim 11, wherein the spring is a C-spring having one end mounted to the actuating member and another end mounted to the locking member.

13. The locking device according to claim 12, wherein the locking member is provided with a guide pin which extends through a recess in the actuating member and is engaged by the C-spring.

14. The locking device according to claim 1, wherein a slotted guide is provided which allows a limited adjustment of the locking member relative to the actuating member.

15. The locking device according to claim 1, wherein the actuating member surrounds the blocking ring by more than 180 degrees.

16. The locking device according to claim 1, wherein a sensor is provided for detecting the position of the actuating member.

\* \* \* \* \*